United States Patent [19]
Barbee et al.

[11] Patent Number: 5,220,405
[45] Date of Patent: Jun. 15, 1993

[54] INTERFEROMETER FOR IN SITU MEASUREMENT OF THIN FILM THICKNESS CHANGES

[75] Inventors: Steven G. Barbee, Dover Plains; Leping Li, New Paltz; Victor J. Silvestri, Hopewell Junction, all of N.Y.

[73] Assignee: International Business Machines Corporation, Armonk, N.Y.

[21] Appl. No.: 811,506

[22] Filed: Dec. 20, 1991

[51] Int. Cl.$^5$ ............................................. G01B 11/02
[52] U.S. Cl. .................................... 356/357; 356/359; 356/358; 356/360; 356/445; 356/381; 156/626
[58] Field of Search ............... 356/357, 359, 358, 360, 356/445, 446, 447, 381, 135–137; 156/626

[56] References Cited

U.S. PATENT DOCUMENTS

| | | | |
|---|---|---|---|
| 3,612,692 | 10/1971 | Kruppa et al. | 356/108 |
| 3,744,916 | 7/1973 | Bey et al. | 356/161 |
| 4,141,780 | 2/1979 | Kleinknecht | 156/626 |
| 4,147,435 | 4/1979 | Habegger | 356/357 |
| 4,203,799 | 5/1980 | Sugawara et al. | 156/601 |
| 4,367,044 | 1/1983 | Booth, Jr. | 356/357 |
| 4,422,764 | 12/1983 | Eastman | 356/357 |
| 4,443,106 | 4/1984 | Yasuda et al. | 356/357 |

FOREIGN PATENT DOCUMENTS

| | | | |
|---|---|---|---|
| 0029708 | 3/1980 | Japan | 356/357 |
| 0084401 | 4/1991 | Japan | 356/381 |

OTHER PUBLICATIONS

Handbook of Thin Film Technology edited by Leon I. Maissel and Reinhard Glang, McGraw-Hill Book Company, 11-11.
L. Peters, "Techniques for Measuring Metal Films," Semiconductor International, Jun. 1991, p. 81.
IBM Technical Disclosure Bulletin, vol. 25, No. 10, Mar. 1983 "Interferometer for In Situ Measuring Etch and Deposition Rates" by H. Stein.
Temperature measurements of glass substrates during plasma etching-R. A. Bond et al.; Journal of Vacuum Science Technology; vol. 18, No. 2, Mar. 1991, pp. 335-338.

*Primary Examiner*—Samuel A. Turner
*Assistant Examiner*—La Charles Keesee
*Attorney, Agent, or Firm*—Richard A. Romanchik; Michael J. Balconi-Lamica

[57] ABSTRACT

An interferometer 10 for measuring the position of the process surface 21 of a substrate 20 includes a coherent light source 12 for providing a light beam 14 which is partially transmitted and partially reflected by a beam splitter 16. The reflected light beam 18 is reflected off of the process surface 21 and the transmitted light beam 30 is reflected off of a translator 32 which vibrates a predetermined distance at a predetermined frequency. The phase shift between the light beams 22, 31 reflected off of translator 32 and the process surface 21 is measured using a photodetector 24, which provides an output signal 26 to a feedback servo unit 28. The servo unit 28 provides an output signal 38 which controls the vibration of translator 32. The output signal 38 of servo unit 28 is also indicative of the position of the process surface 21.

24 Claims, 2 Drawing Sheets

INTERFEROMETER FOR IN SITU MEASUREMENT OF THIN FILM THICKNESS CHANGES

FIELD OF THE INVENTION

The present invention relates to integrated circuit manufacturing, and more particularly, to an interferometer for in situ measurement of thin film thickness changes at the monolayer level which are caused by etching or deposition.

BACKGROUND ART

Fabrication techniques for microelectronic devices require that small, exacting changes be made in very thin films of material. In order to produce these types of thin films accurately and consistently, an in situ measurement technique is needed to monitor the film thickness during the different process steps which effectuate thickness changes. Various measurement techniques have previously been developed to measure films, but none of which meet the requirement of measuring thin films (i.e. films with thicknesses on the order of one monolayer).

Heretofore, the best measurement technique for each application or process has been dependent upon the film type, the thickness of the film, and the accuracy desired. These criteria include such properties as film thickness, film transparency, thickness uniformity, film and substrate smoothness, film and substrate optical properties, and film and substrate size. Various types of optical interference phenomena, or optical interferometry, have been found to be most useful for the measurement of thin films, which are generally on the order of a wavelength of light. These optical interferometry measurement systems may be classified into two categories, those that measure transparent films and those that measure opaque films. It has been found that the most widely used thin film optical interferometry techniques measure transparent films on silicon substrates. However, advancements in semiconductor technology have resulted in a specific need for measuring very thin film opaque materials, such as metals and stacked layers, on a variety of substrates or media.

Prior techniques for monitoring opaque films typically rely on the use of 2-beam interferometry to extract the etched rate of the material. In such arrangements, a single wavefront of light is split into two beams, one of which, strikes a non-etching surface which serves as a reference while the other beam strikes the surface being etched which is moving away from the reference. The change in path length thus causes a phase shift which produces a sinusoidal type signal after the two beams are recombined at a photodetector. An example of this types of system can be found in U.S. Pat. No. 4,147,435 (Habegger, et al.). These types of systems, however, suffer from inherent poor thickness control since the total etch depth is on the same order of magnitude as the resolution of the system itself.

More recent attempts to solve the deficiencies of the two beam systems involve the use of monitor wafers to provide reference reflected signals which are compared to reflections off of the surface under process. An example of this type of system is disclosed in commonly owned U.S. Pat. No. 4,367,044 (Booth Jr., et al.).

The optical interferometry systems disclosed in Habegger, et al. and Booth Jr., et al., however, are impractical for present VLSI fabrication technology, because of inadequate resolution, and difficulties inherent in aligning the systems and maintaining the alignment.

A system for accurately measuring opaque film thickness in situ during etching and deposition processes which overcomes the deficiencies of the prior art is therefore highly desirable.

DISCLOSURE OF THE INVENTION

An object of the present invention is to provide an improved in situ optical interferometry method and apparatus for monioring film thickness changes during etching or deposition processes.

Another object of the present invention is to provide an improved in situ optical interferometry method and apparatus for monitoring opaque film thickness changes during etching or deposition processes.

Yet another object of the present invention is to provide an improved in situ optical interferometry method and apparatus for monitoring opaque film thickness changes during etching or deposition processes with high resolution and accuracy.

In accordance with a first embodiment of the present invention, an interferometer includes a coherent light source; a beam splitter for partially reflecting and partially transmitting the coherent light; a modulating mirror for reflecting the transmitted coherent light; a substrate under process for reflecting the reflected light; and detection and measurement means for measuring the phase shift between light reflected off of the substrate and light reflected off of the modulating mirror.

In accordance with a second embodiment of the present invention, an interferometer includes a pair of interferometers in accordance with the first embodiment of the present invention, both systems utilizing the same coherent light source, wherein the first interferometer measures the phase difference between light reflected off of the process surface of the substrate and the modulating mirror and the second interferometer measures the phase difference between light reflected off of the backside surface of the substrate which is opposite to the process surface and a second modulating mirror. The two phase difference signals are compared to one another and any difference is subtracted from the phase difference signal provided by the process surface of the substrate in order to negate the effects of the system vibration, wafer warping and other events which might render a single interferometer inaccurate.

The present invention is easy to manufacture and provides in situ film thickness measurements at the monolayer level. In addition, the present invention may be utilized as an end point detection system in order to stop processing with monolayer resolution.

These and other objects, features, and advantages of the present invention will become more apparent in light of the detailed description of exemplary embodiments thereof, as illustrated by the drawings.

A BRIEF DESCRIPTION OF THE DRAWINGS

BEST MODE FOR CARRYING OUT THE INVENTION

Figure 1:
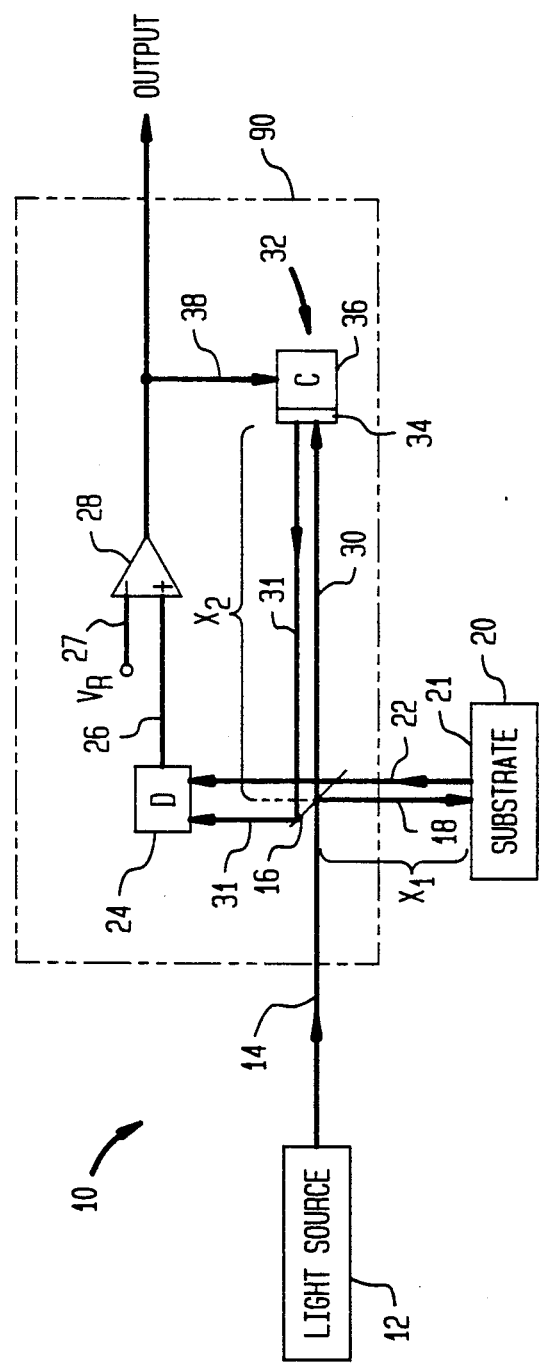
FIG. 1 is a schematic block diagram of an interferometer in accordance with a first embodiment of the present invention.

Referring now to FIG. 1, an interferometer 10 in accordance with a first embodiment of the present invention includes a coherent light source 12 for providing coherent light. Light source 12 may be a HeNe laser, such as the 05 LHR catalog series manufactured by Melles Griot, a company located in Switzerland. The light beam from light source 12 (represented by a line 14) is partially reflected and partially transmitted by a beam splitter 16. Beam splitter 16 may be any of a number of beam splitters known in the art, such as catalog number 03BTF007 manufactured by aforementioned Melles Griot. The preferred beam splitter is 50/50 type beam splitter, wherein 50% of the beam is transmitted and 50% is reflected. However, the particular reflection/transmission ratio is not critical to the operation of the present invention. The light beam reflected by beam splitter 16 (represented by line 18) is reflected off of a substrate 20 having a process surface 21 undergoing either deposition or etching wherein a position of the process surface 21 is to be monitored and/or measured. The light beam reflected (represented by line 22) off of substrate 20 is partially transmitted back through beam splitter 16 and impinges upon a photodetector 24.

Figure 2:
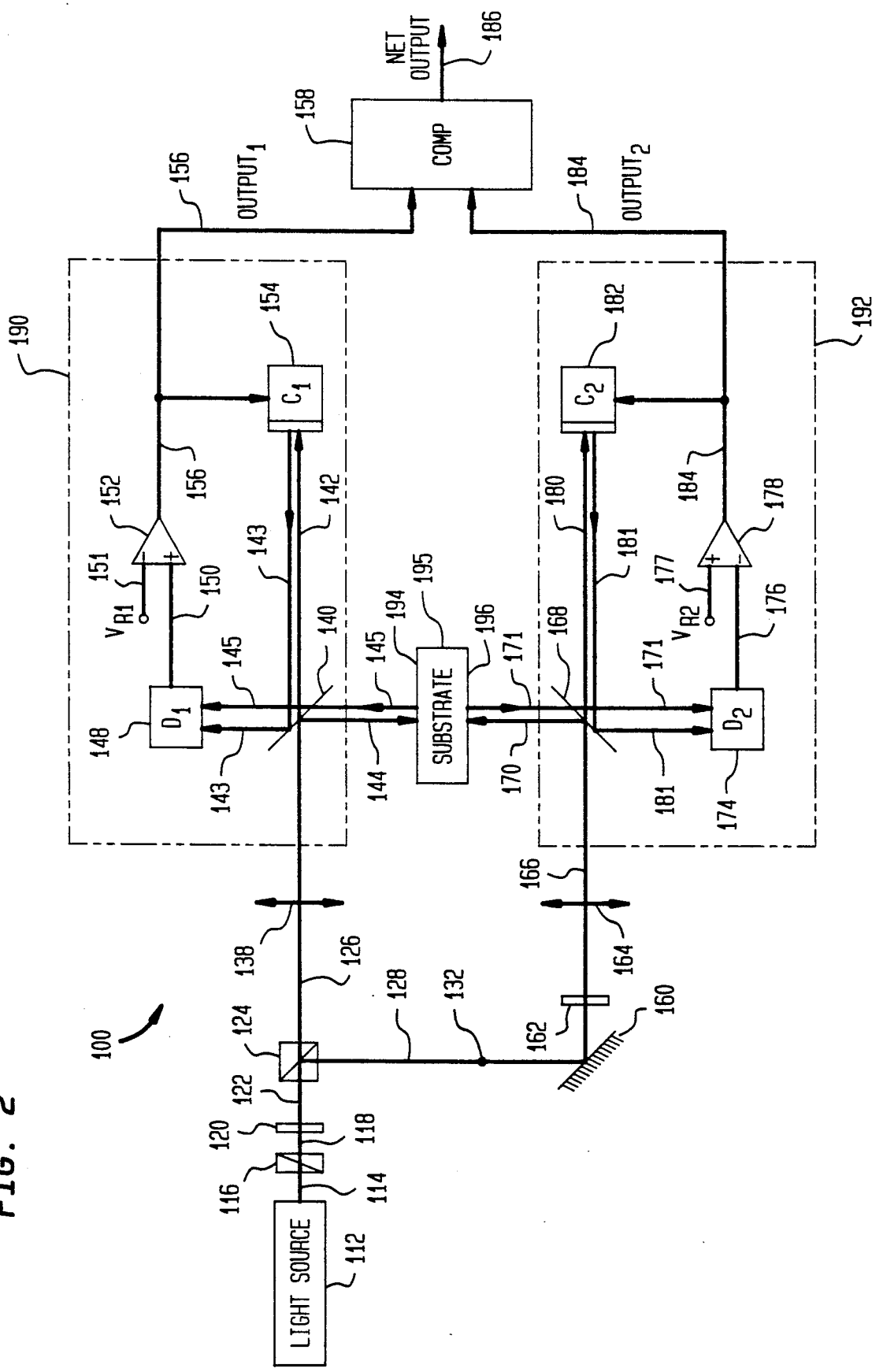
FIG. 2 is a schematic block diagram of an interferometer in accordance with a second embodiment of the present invention.

It is to be noted that in FIG. 1 and FIG. 2 of the present invention, colinear light beams are represented as separated lines. As exemplified by lines 18 and 22.

Photodetector 24 may be any of a number of transducers known in the art utilized to transduce light energy into electrical energy, such as the DT series of photodiodes manufactured by EG&G ELECTRO-OPTICS located in Salem, Mass. Photodetector 24 provides an electrical signal on a line 26, representative of the intensity of light impinging thereupon, to measurement instrumentation (not shown), such as a phase or voltage meter. The output signal 26 of detector 24 is also provided to a servo unit 28.

Beam splitter 16 also transmits part of light beam 14. The transmitted light beam (represented by line 30) impinges upon a translator 32 having a reflector 34, such as a mirror, which reflects a light beam 31 back towards the beam splitter 16. The light beam (represented by line 31) reflected off of reflector 34 is partially reflected by beam splitter 16 towards photodetector 24. The reflector 34 is attached to a modulator 36, which translates or moves the reflector a predetermined displacement proportional to a voltage signal applied thereto, as will be explained in greater detail hereinafter. The preferred modulator 36 for the present invention is a piezoelectric crystal, such as those manufactured by Dr. Lutz Pickelman of Piezomechanik Optik located in Munich, Germany. The amount of displacement of translator 32 is proportional to the voltage signal provided on a line 38 to the piezoelectric crystal 32.

The voltage output signal 38 is provided by servo unit 28, which is responsive to the output signal 26 from photodetector 24. Servo unit 28 is a system which compares the voltage signal 26 with a predetermined reference voltage $V_R$ provided on a line 27, amplifies and otherwise conditions the difference signal and provides the conditioned difference signal on line 38. Servo unit 28 may be comprised of any of a number of circuits well known in the electronics art that compares two input signals and amplifies the resultant difference signal, and is not explicitly detailed herein. Photodetector output signal 26 is functionally related to, and representative of the intensity of the combined light beams 22 and 31 coming from the substrate 20 and the translator 32. The intensity of the combined light beams 22 and 31 is a function of their phase difference. The phase difference between the two signals is in turn dependent upon the difference in distances $X_1$ and $X_2$ between the beam splitter 16 and the process surface 21 and the beam splitter 16 and the reflector 34. Servo unit 28 therefore provides a voltage output signal on line 38 which is a function of the relative position of the process surface 21. As the output signal 38 of servo unit 28 increases, the displacement of modulator 36 increases, thereby driving the output signal 38 to zero. Servo unit 28 therefore provides a feedback loop to translator 32.

The voltage output signal 38 of servo unit 28 is also provided to measurement instrumentation (not shown). As described hereinbefore, the voltage output signal 38 is a function of the position of the process surface 21 of the substrate 20, and can be measured and used to provide accurate information about the amount of deposition or etching taking place on a substrate. As a matter of fact, in the preferred embodiment, changes on substrate 20 can be measured to the monolayer level, thereby providing an order of magnitude better resolution than previous interferometry techniques described hereinbefore.

Operation of the interferometer of the present invention is as follows. Light 14 from light source 12 is partially reflected by beam splitter 16 and reflected off of the substrate 20 under process, transmitted through beam splitter 16 and provided to photodetector 24. Light 14 from light source 12 is also partially transmitted through beam splitter 16, reflected off translator 32, and reflected by beam splitter 16 into the photodetector 24. The two combined light beams 22, 31 impinge on photodetector 24. These two light beams combine to either add to one another or subtract from one another, depending on the phase difference between the two light beams, with the amount of addition or subtraction being manifested by the intensity of the light impinging upon photodetector 24, which is thereby transduced by photodetector 24 into an electrical signal representative of the intensity of the combined light beams 22, 31. The transduced signal is provided via line 26. Servo unit 28 compares the signal on line 26 with a reference voltage $V_R$ and amplifies the difference signal to provide a feedback signal on line 38 to the translator 32. Preferably, $V_R$ is set to have a magnitude equal to photodetector output signal 26 at the beginning of the deposition or etching process, thereby causing an initial voltage output signal 38 of servo unit 28 of zero. The etching or deposition process is then started and the process surface 21 moves due to growth or etching. As a result of the process, the photodetector 24 will see a change in light intensity compared to that previously provided. The difference of this light intensity is converted into an electrical signal and provided on line 26 to the servo unit 28. The servo unit 28 thereby provides an output signal 38 which causes the modulator to change the position of the reflector 34, thereby maintaining minimum light intensity at the photodetector 24. The voltage output signal 38 provided by servo unit 28 is therefore a function of the amount of displacement required by translator 32 to maintain the minimum light intensity at photodetector 24. Therefore, the voltage output provided on line 38 by zero 28 is a function of the amount of change or displacement on the substrate surface 20 and is indicative of the amount of deposition or etching taking place. The mathematical relationship between the intensity of input light 14 and the intensity of light of the combined light beams 22, 31 at the photodetector 24 is as follows:

(1) If the incident electric field is defined as:

$$E = E_0 \cos(wt - kx + \Theta) \tag{1}$$

where $E_0$ = is the amplitude of the incident electric field
$w = 2\pi v$ is the circular frequency of the light $$= \frac{2\pi}{T}$$

T is the period of electric field oscillation.

$$k = \frac{2\pi}{\lambda} \text{ and is the wave vector}$$

$\lambda$ is the wavelength
$\Theta$ is the constant initial phase (arbitrary)

(2) Then at the detector the measured intensity $I_D$ is proportional to $|E_D|^2$ in the following manner:

$$I_D \alpha 1/T \int_O^T dt |E_D|^2 = \tag{2}$$

$$\int_O^T \frac{dt}{T} |E_1 \cos[wt - k(x + 2x_1) + \Theta] +$$

$$E_2 \cos[wt - k(x + 2x_2) + \Theta]|^2$$

where $x_1$ is the distance between the reflecting surface of the sample and the beam splitter
$x_2$ is the distance between beam splitter and reflecting surface of the modulating mirror
$E_D$ is the amplitude of the incident electric field at the photodetector
$E_1$ is the amplitude of the incident electric field at the photodetector from the substrate surface
$E_2$ is the amplitude of the incident electric field at the photodetector from the translator For a 50/50 Beam Splitter, then $E_1 = E_2$ and $$|E_1 \cos[wt - k(x + 2x_1) + \Theta + E_2 \cos[wt - k(x + 2x_2) + \Theta]|^2 =$$

$$|E_1|^2 |\cos[wt - k(x + 2x_1) + \Theta] + \cos[wt - k(x + 2x_2) + \Theta]|^2$$

Using the mathematical identity $$\cos\alpha + \cos\beta = 2\cos\frac{(\alpha + \beta)}{2} \cos\frac{(\alpha - \beta)}{2}$$

Then $$|E_D|^2 = |E_1|^2 (2\cos[wt - kx - k(x_1 + x_2) + \Theta]\cos[k(x_1 - x_2)])^2$$
$$= 4|E_1|^2 \cos^2[wt - k(x + x_1 + x_2) + \Theta]\cos^2[k(x_1 - x_2)]$$

Thus $$I_D \alpha 1/T \int_O^T dt |E_D|^2 =$$

$$4/T |E_1|^2 \cos^2[k(x_1 - x_2)] \int_O^T dt \cos^2[wt - k(x + x_1 + x_2) + \Theta]$$

Since $$\int_O^T dt \cos^2[wt - k(x + x_1 + x_2) + \Theta] = T/2$$

Then
$$I_D \alpha 4/T |E|^2 \cos^2[k(X_1 - x_2)]T/2 = 2|E_1|^2 \cos^2[k(x_1 - x_2)] \tag{3}$$

Thus $$I_D = \text{coef. } 1/T \int_O^T dt |E_D|^2 \tag{4}$$

$$= \text{coef. } 2|E_1|^2 \cos^2[k(x_1 - x_2)]$$

$$= I_0 \cos^2[k(x_1 - x_2)]$$

Where we define $$I_0 = 2\text{coef. } |E_1|^2$$

Therefore $$I_D = I_0 \cos^2[k(x_1 - x_2)] \tag{5}$$

The interferometer 10 in accordance with the first embodiment of the present invention is useful under the ideal condition that the substrate 20 remains stable under process conditions. However, this assumption is typically untrue in manufacturing environments and steps must be taken to account for vibrations and other movement of substrate 20 during the process which might render measurements inaccurate.

Referring not to FIG. 2, a second embodiment of the interferometer system 100 in accordance with the present invention accounts for vibration and movement of the substrate 20 and includes a light source 112 identical to light source 12 described and illustrated hereinbefore in FIG. 1, which provides a light output 114 into a linear polarizer 116 such as catalog number 03A PTA 105 manufactured by Melles Griot. The polarized output light beam 118 of linear polarizer 116 is transmitted through a half wave plate 120 which rotates the polarized light 118 a predetermined angle which is controllable by adjusting the reflective surfaces therein. Half wave plate 120 may be any of a number of such items known in the art, such as catalog number 02 WRM 035 manufactured by Melles Griot. The rotated light beam 122 is provided to a beam splitter cube 124, such as catalog number 03 BSD 035 manufactured by Melles Griot, which provides two light beams, 126, 128 that make up the orthogonal components of the rotated light beam 122 vector. The output light beams 126, 128 of beam splitter cube 124 therefore have orthogonal planes of polarization indicated by arrow 138 and dot 132, respectively. The transmitted light signal 126 from beam splitter cube 124 is provided to a beam splitter 140, which is a beam splitter identical to the beam splitter 16 described and illustrated hereinbefore in FIG. 1. Beam splitter 140 partially transmits and partially reflects light beam 136 to thereby provide light beams 142, 144, respectively. The reflected light beam 144 is reflected off of the processing surface 194 of substrate 195 and then transmitted through beam splitter 140 and provided to a photodetector 148 ($D_1$), which is a photodetector identical to photodetector 24 described and illustrated hereinbefore in FIG. 1. The transmitted light beam 142 from beam splitter 140 is reflected off a translator 154, which is identical to translator 32 described and illustrated hereinbefore in FIG. 1. The light beam reflected off of translator 154 is represented by line 143 and is reflected by beam splitter 140 and also provided to photodetector 148. The output signal of photodetector 148 is provided on a line 150 to a servo unit 152, which is identical to servo unit 28 described and illustrated hereinbefore for FIG. 1. The output signal of servo unit 152 is provided on a line 156 to translator 154 and to a comparator 158.

The reflected light 128 from beam splitter 124 is reflected off of a mirror 160 and transmitted through a half wave plate 162. Half wave plate 162 rotates the plane of polarization of light 128 and is illustrated by arrow 164. The rotated light signal 166 is provided to a second beam splitter 168, which is identical to the first beam splitter 140.

The light beam 170 reflected by beam splitter 168 is reflected off of the backside surface 196 of substrate 195. The light beam reflected off of surface 196 is represented by line 171 and is transmitted through beam splitter 168 and provided to a second photodetector 174 which is identical to photodetector 148. Photodetector 174 provides an output signal on a line 176 to a second servo system 178 which is identical to the first servo system 152.

The light beam 180 transmitted through beam splitter 168 is reflected off of a second translator 182 which is identical to the first translator 154. The reflected light beam off of the second translator 182 is represented by line 181 and is reflected by beam splitter 168 and is also provided to photodetector 174. Photodetector 174 transduces the combined light beam 172 to provide an output signal on a line 176 to a second servo unit 178 identical to servo unit 152 described hereinbefore. The output of servo unit 178 is provided on a line 184 to the translator 182 and also to comparator 158. Comparator 158 compares electrical signals 156 and 184 and provides an electrical difference signal on a line 186 to be utilized by measurement equipment (not shown).

The interferometer system 100 therefore has two essentially identical measurement systems 190, 192 which measure the relative position of the process side 194 and the backside 196 of substrate 195, respectively. It is to be noted that other surfaces other than the backside surface may be used. The output signal 184 from the measurement system 192 is provided as a reference signal and is subtracted from the output signal 156 of measurement system 190 by comparator 158. Changes due to vibration, motion, or other external inputs to the relative position of the substrate 198 are then accounted for by the dual measurement system of interferometer 100, thereby providing a net output 186 which is independent of such vibrations or position changes. Each of the measurement systems 190, 192 operates identically to the interferometer system 10 described and illustrated hereinbefore.

It is to be noted that the arrangement of the linear polarizer 116, half wave plate 120 and beam splitter cube 124 are provided as an adjustment to compensate for the relative reflective properties of the substrate process surface 194 and the substrate backside 196. For example, if the substrate backside is highly reflective relative to the substrate process surface, beam splitter cube can be adjusted to allow more light to be transmitted (line 138) than reflected (line 128). The system can therefore be tuned to provide appropriate signal levels on lines 156 and 184 at the beginning of the deposition or etching process. Of course, additional compensation means may be provided in other areas, such as in the servo units 152, 178.

It is also to be noted that in the present invention, it is preferable that the frequency of the input light provided by light sources 12, 112 described hereinbefore is such that the substrate process surface, the substrate backside surface and the reflector surface are opaque to the light.

It is further to be noted that it is not critical that in the exemplary embodiments described hereinbefore the translators 32, 154, 182 reflect the light transmitted through beam splitters 16, 140, 168. The system would work just as well if the translators reflected the transmitted light.

The present invention is well suited for use as an endpoint detection system, wherein the output signals 38, 186 are compared (by measurement systems not shown) with a desired magnitude. Once the output signals reach the desired value (indicating the desired process endpoint), the deposition or etching process in progress may be stopped. The interferometer may then be initialized for the start of the next process.

The present invention is also well suited to measure substrate surface topography. Referring to FIG. 1, the topography of substrate surface 21 may be measured by combining beam splitter 16, photodetector 24 and translator 32 into a block 90 which translates in the same plane as light beam 14 the distance across the entire substrate surface 21. The interferometer 10 may thus be utilized to "scan" across the substrate surface 21 and measure the topography thereof. Although comparator 28 is shown within block 90, it is not necessary for this unit to be combined with the translating block 90.

Referring now to FIG. 2, block 190 may translate in the same plane as light beam 126 and therefore may also be utilized in a similar manner as block 90 of FIG. 1 to scan across substrate surface 194, likewise measuring the topography thereof.

Another application of the present invention is measure thermal expansion of substrates 20, 195 by monitoring the relative position of substrate surfaces 21, 194 as described and illustrated hereinbefore for FIGS. 1 and 2. The present invention may thus be utilized to measure the expansion and contraction of substrates 20, 195.

Although the invention has been shown and described with exemplary embodiments thereof, it should be understood by those skilled in the art that the foregoing and various other changes, omissions and additions may be made therein and thereto without departing from the spirit and scope of the invention.

We claim:

1. An apparatus comprising:
    first light source means for providing a first light beam of coherent light;
    first beam splitter means for partially transmitting and partially reflecting said first light beam, thereby providing a second light beam and a third light beam, respectively;
    second beam splitter means for partially reflecting and partially transmitting said second light beam, thereby providing a fourth light beam and a fifth light beam, respectively;

first translating means having a first translating surface which translates a predetermined distance for reflecting said fifth light beam to thereby provide a sixth light beam;

a substrate having: a processing surface, the position of which is to be measured; and a back surface, wherein said processing surface reflects said fourth light beam to thereby provide a seventh light beam;

first measurement means responsive to said sixth and seventh light beams for measuring the phase shift therebetween, wherein the phase shift is a function of the difference in position of the processing surface and the first translating surface and wherein said first measurement means provides a first measurement signal indicative of the relative position of the processing surface;

third beam splitter means for partially reflecting and partially transmitting said third light beam, thereby providing an eighth light beam and a ninth light beam, respectively;

second translating means having a second translating surface which translates a predetermined distance for reflecting said ninth light beam to thereby provide a tenth light beam, wherein the back surface reflects said eighth light beam to thereby provide an eleventh light beam;

second measurement means responsive to said tenth and eleventh light beams for measuring the phase shift therebetween, wherein the phase shift is a function of the difference in position of the back surface and the second translating surface and wherein said second measurement means provides a second measurement signal indicative of the relative position of the back surface; and, comparator means comparing the first and second measurement signals to thereby provide a position output signal.

2. An apparatus according to claim 1, further comprising:

first and second control means responsive to the first and second measurement signals, respectively, for providing first and second feedback control signals, respectively.

3. An apparatus according to claim 2, wherein said first and second control means are each comprised of:

comparator means for comparing the respective measurement signal to a reference signal for providing a difference signal; and, signal conditioning means responsive to the difference signal for conditioning the difference signal and providing the feedback control signal as a function of the difference signal.

4. An apparatus according to claim 1, wherein said first and second translating means are comprised of a reflective substrate attached to a piezoelectric crystal.

5. An apparatus according to claim 1, wherein said second and third beam splitters partially transmit on the order of half of said second and third light beams, respectively.

6. An apparatus according to claim 1, wherein said first and second measurement means are comprised of a photodetector.

7. An apparatus according to claim 1, further comprising scanning means for translating said second beam splitter means, said first translating means and said first measurement means in the same plane as said first light beam for measuring the topography or the processing surface.

8. A semiconductor processing apparatus comprising:

processing chamber means for providing conditions required to process a substrate, said substrate having a processing surface and a back surface, the processing surface having a position of which is to be measured;

light source means for providing a first light beam of coherent light;

first beam splitter means for partially transmitting and partially reflecting said first light beam, thereby providing a second light beam and a third light beam, respectively;

second beam splitter means for partially reflecting and partially transmitting said second light beam, thereby providing a fourth light beam and a fifth light beam, respectively;

first translating means having a first translating surface which translates a predetermined distance for reflecting said fifth light beam to thereby provide a sixth light beam, wherein the processing surface reflects said fourth light beam to thereby provide a seventh light beam;

first measurement means responsive to said sixth and seventh light beams for measuring the phase shift therebetween, wherein the phase shift is a function of the difference in position of the processing surface and the first translating surface and wherein said first measurement means provides a first measurement signal indicative of the relative position of the processing surface;

third beam splitter means for partially reflecting and partially transmitting said third light beam, thereby providing an eighth light beam and a ninth light beam, respectively;

second translating means having a second translating surface which translates a predetermined distance for reflecting said ninth light beam to thereby provide a tenth light beam, wherein the back surface reflects said eighth light beam to thereby provide an eleventh light beam;

second measurement means responsive to said tenth and eleventh light beams for measuring the phase shift therebetween, wherein the phase shift is a function of the difference in position of the back surface and the second translating surface and wherein said second measurement means provides a second measurement signal indicative of the relative position of the back surface; and, comparator means for comparing the first and second measurement signals to thereby provide a position output signal.

9. An apparatus according to claim 8, wherein said first and second translating means are comprised of a reflective substrate attached to a piezoelectric crystal.

10. An apparatus according to claim 8, wherein said second and third beam splitters partially transmit on the order of half of said second and third light beams, respectively.

11. An apparatus according to claim 8, wherein said first and second measurement means are comprised of a photodetector.

12. A method for measuring the position of a substrate processing surface, the substrate further having a back surface, said method comprising the steps of:

providing a first light beam of coherent light;

providing a first beam splitter for partially transmitting said first light beam, thereby providing a second light beam, and partially reflecting said first light beam, thereby providing a third light beam;

providing a second beam splitter for partially reflecting said second light beam, thereby providing a fourth light beam, and partially transmitting said third light beam, thereby providing a fifth light beam;

providing a first translating means having a first translating surface which translates a first predetermined distance for reflecting said fifth light beam to thereby provide a sixth light beam;

reflecting said fourth light beam off of the processing surface to thereby provide a seventh light beam;

measuring the phase shift between said sixth and seventh light beams, wherein the phase shift is a function of the relative position of the processing surface;

providing a first measurement signal indicative of the phase shift between the sixth and seventh light beams;

controlling said first predetermined distance in response to said first measurement signal;

providing a third beam splitter for partially reflecting said third light beam, thereby providing an eighth light beam, and partially transmitting said third light beam, thereby providing a ninth light beam;

providing a second translating means having second a translating surface which translates a second predetermined distance for reflecting said ninth light beam to thereby provide a tenth light beam;

reflecting said eighth light beam off of the back surface to thereby provide an eleventh light beam;

measuring the phase shift between said tenth and eleventh light beams, wherein the phase shift is a function of the relative position of the back surface;

providing a second measurement signal indicative of the phase shift between the tenth and eleventh light beams;

controlling said second predetermined distance in response to said second measurement signal; and, comparing said first and second measurement signals to thereby provide a net output signal.

13. A method for measuring the position of a substrate surface according to claim 12, wherein said first and second translating means are comprised of a reflective substrate attached to a piezoelectric crystal.

14. A method for measuring the position of a substrate surface according to claim 12, wherein said second and third beam splitters transmit on the order of half of said second and third light beams, respectively.

15. A method for measuring the position of a substrate surface according to claim 12, wherein the ratio of transmitted to reflected light of said first beam splitter is variable.

16. A method for measuring the position of a substrate surface according to claim 12, wherein a photodetector is utilized for said measuring steps.

17. A method for measuring the position of a substrate surface according to claim 16, further comprising the step of translating said second beam splitter, said first translating means and said first photodetector in the same plane as said first light beam for measuring the topography of the processing surface.

18. An apparatus for measuring a position of a processing surface on a substrate, the substrate further having a back surface, said apparatus comprising:

first light source means for providing a first light beam of coherent light;

first beam splitter means for partially transmitting and partially reflecting said first light beam, thereby providing a second light beam and a third light beam, respectively;

second beam splitter means for partially reflecting and partially transmitting said second light beam, thereby providing a fourth light beam and a fifth light beam, respectively;

first translating means having a first translating surface which translates a predetermined distance for reflecting said fifth light beam to thereby provide a sixth light beam, and wherein the processing surface reflects said fourth light beam to thereby provide a seventh light beam;

first measurement means responsive to said sixth and seventh light beams for measuring the phase shift therebetween, wherein the phase shift is a function of the difference in position of the processing surface and the first translating surface and wherein said first measurement means provides a first measurement signal indicative of the relative position of the processing surface;

third beam splitter means for partially reflecting and partially transmitting said third light beam, thereby providing an eighth light beam and a ninth light beam, respectively;

second translating means having a second translating surface which translates a predetermined distance for reflecting said ninth light beam to thereby provide a tenth light beam, and wherein the back surface reflects said eighth light beam to thereby provide an eleventh light beam;

second measurement means responsive to said tenth and eleventh light beams for measuring the phase shift therebetween, wherein the phase shift is a function of the difference in position of the back surface and the second translating surface and wherein said second measurement means provides a second measurement signal indicative of the relative position of the back surface; and, comparator means for comparing the first and second measurement signals to thereby provide a position output signal.

19. The apparatus according to claim 18, further comprising:

first control means responsive to said first measurement signal for providing a first feedback control signal to said first translating means; and second control means responsive to the second measurement signal for providing a second feedback control signal to said second translating means.

20. The apparatus according to claim 19, wherein said first control means comprises a first comparator means for comparing the first measurement signal to a first reference signal for providing a first difference signal, said first control means further comprises a first signal conditioning means, responsive to the first difference signal, for conditioning the first difference signal and providing the first control signal as a function of the first difference signal, and said second control means comprises a second comparator means for comparing the second measurement signal to a second reference signal for providing a second difference signal, said second control means further comprises a second signal conditioning means, responsive to the second difference signal, for conditioning the second difference signal and providing the second control signal as a function of the second difference signal.

21. The apparatus according to claim 18, wherein said first and second translating means are comprised of a reflective substrate attached to a piezoelectric crystal, respectively.

22. The apparatus according to claim 18, wherein said second and third beam splitters partially transmit on the order of half of said second and third light beams, respectively.

23. The apparatus according to claim 18, wherein said first and second measurement means are comprised of a photodetector, respectively.

24. The apparatus according to claim 18, further comprising scanning means for translating said second beam splitter means, said first translating means and said first measurement means in the same plane as said first light beam for measuring the topography of the processing surface.

* * * * *

UNITED STATES PATENT AND TRADEMARK OFFICE
CERTIFICATE OF CORRECTION

PATENT NO. : 5,220,405
DATED : June 15, 1993
INVENTOR(S) : Steven G. Barbee, Leping Li, Victor J. Silvestri It is certified that error appears in the above-identified patent and that said Letters Patent is hereby corrected as shown below:

In column 2, line 12: change "monioring" to --monitoring--.

In column 4, line 68: change "zero" to --servo--

In column 6, line 11: change "$(X_1-X_2)$" to --$(x_1-x_2)$--.

In column 6, line 39: change "not" to --now--.

In column 9, line 67: change "or" to --of--.

Signed and Sealed this

Twenty-ninth Day of March, 1994

*Attest:*

BRUCE LEHMAN

*Attesting Officer*  *Commissioner of Patents and Trademarks*